United States Patent [19]

Morrison

[11] Patent Number: 5,764,298

[45] Date of Patent: Jun. 9, 1998

[54] DIGITAL DATA TRANSCODER WITH RELAXED INTERNAL DECODER/CODER INTERFACE FRAME JITTER REQUIREMENTS

[75] Inventor: David Geoffrey Morrison, Suffolk, United Kingdom

[73] Assignee: British Telecommunications public limited company, London, England

[21] Appl. No.: 522,339

[22] PCT Filed: Mar. 25, 1994

[86] PCT No.: PCT/GB94/00627

§ 371 Date: Sep. 14, 1995

§ 102(e) Date: Sep. 14, 1995

[87] PCT Pub. No.: WO94/23536

PCT Pub. Date: Oct. 13, 1994

[30] Foreign Application Priority Data

Mar. 26, 1993 [GB] United Kingdom ............... 93302384

[51] Int. Cl.$^6$ ........................................ H04N 5/04
[52] U.S. Cl. ................. 348/500; 348/512; 348/518
[58] Field of Search .......................... 348/470, 497, 348/500, 512, 518, 469, 384

[56] References Cited

U.S. PATENT DOCUMENTS 4,963,965  10/1990  Haghiri ...................... 348/441
5,404,446   4/1995  Bowater ..................... 395/162

OTHER PUBLICATIONS

Pank, "Picture Conversion for HD Graphics", Broadcast Sessions, Proceedings of the 17$^{th}$ International Television Exhibition, 13 Jun. 1991, Montreux, CH. pp. 552–558, XP268913.
Patent Abstracts of Japan, vol. 7, No. 10 (P-168) 14 Jan. 1983 & JP 1 57166640 (Hitachi Seisakusho K.K.), 14 Oct. 1982.
Patent Abstracts of Japan, vol. 15, No. 254 (E-1083) 27 Jun. 1991 & JP A 03082232 (Toshiba Corp.) 8 Apr. 1991.
Patent Abstracts of Japan, vol. 16, No. 520 (P-1444) 26 Oct. 1992 & JP A 04 192080 (Mitsubishi Electric Corp.), 10 Jul. 1992.

Primary Examiner—Victor R. Kostak
Attorney, Agent, or Firm—Nixon & Vanderhye P.C.

[57] ABSTRACT

A transcoder converts a received data stream encoded according to a first coding scheme to a data stream coded according to a second coding schem. The schemes specify a first and a a second maximum amount of jitter that may be present in the encoded data streams, respectively. The transcoder includes a decoder section and an encoder section and is operated such that the data stream received by the encoder section has a non-zero amount of jitter and the encoder section produces a coded data stream having an amount of jitter which is less than or equal to the second maximum amount of jitter. By operating the transcoder to provide a decoded video data stream to the encoder section which retains a degree of jitter relative to the oriignal video signal, the buffer requirements can be minimized therefore providing reduced buffeer delay and hence a transcoder with smaller buffer delay than previously obtainable.

13 Claims, 5 Drawing Sheets

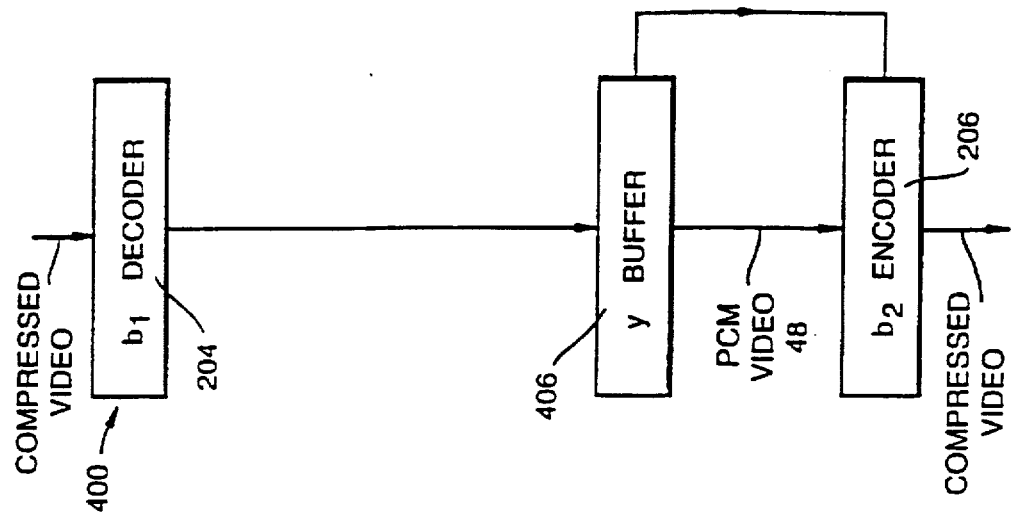
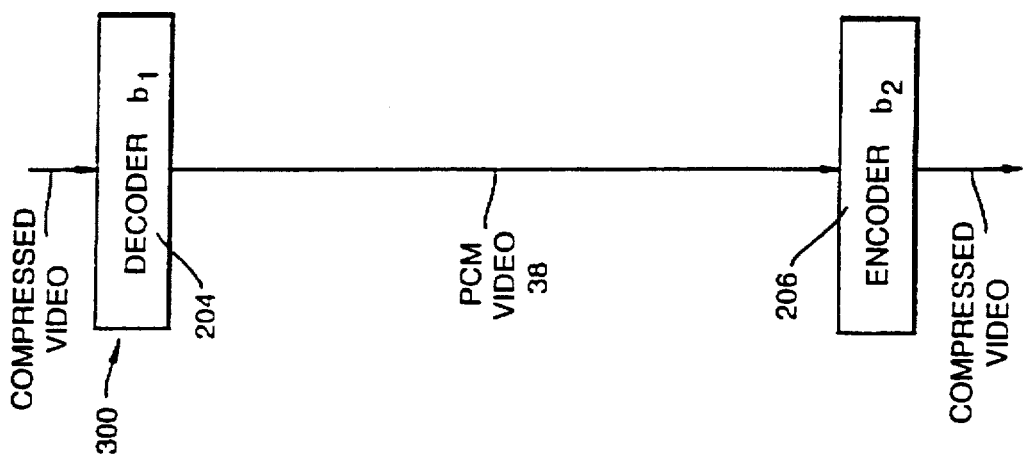
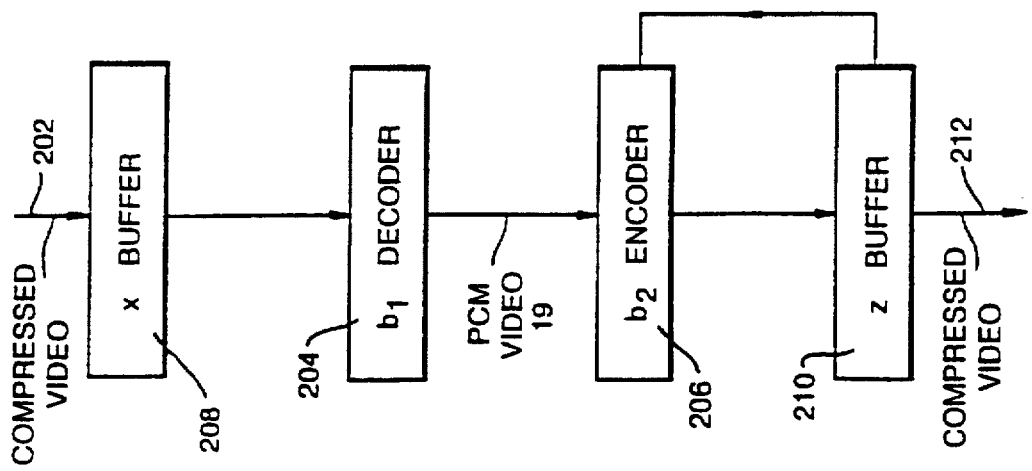

DIGITAL DATA TRANSCODER WITH RELAXED INTERNAL DECODER/CODER INTERFACE FRAME JITTER REQUIREMENTS

FIELD OF THE INVENTION

This invention relates to transcoders and in particular, but not exclusively, to video transcoders for real-time conversion between a first and a second coding scheme.

RELATED ART

There are many occasions when it is necessary to transmit moving picture television or other real-time generated data, or example speech, over long distances via a transmission link. Broadcast quality television requires around 6 MHz of analogue bandwidth or in excess of 100 Mbit/s when transmitted in digital form and this is expensive to transmit and requires links of high bandwidth. In order to reduce the data rate needed to transmit the signal, various compression techniques are used. Correlation techniques, for example, reduce the amount of information needed to code a particular frame by reference to previously coded video frames. Video compression can also be obtained by allowing an acceptable degree of degradation in the picture quality in order to reduce the information content being transmitted, for example by reducing the frame resolution. So, for example, for video conferencing applications compression down to a bit rate of a few hundred kbit/s is used whereas videophone-quality pictures including sound can be compressed down to only 64 kbit/s, equivalent to a single telephone circuit, and achieve acceptable quality.

Compression techniques may, as indicated above, also be used in areas of technology other than video, for example speech transmission, in order to obtain a higher quality of received transmission for a given allowable bandwidth down the transmission link.

In the case of video coding, to take a particular example, signals (which are typically provided by a video camera) are fed to an encoder which provides an output coded data stream according to some algorithm, for example CCITT Recommendation H. 261 which provides a high degree of compression using spatial and temporal redundancies in the video signals being encoded. The coded data stream can be reconstituted into a series of video signals by a compatible decoder which decompresses the coded data stream.

The video coding technique employed will be chosen to suit the particular application. If a higher broadcast quality is needed or a higher bandwidth transmission link is available other coding algorithms taking advantage of the higher bit rate can be employed.

A characteristic of most encoders which produce highly compressed video data streams is that the rate of generation of bits by the video encoding process is not constant but will depend on the degree of correlation between the current frame being coded and the previous frame or the amount of detail in the region of the frame being coded, or both.

It is possible to provide a constant bit rate in the coded data stream by coding a series of video frames such that the average number of bits per frame is maintained at some given average level. Within this data stream fewer bits are used to code some of the video frames, with more bits being used to code frames which have more information to be coded. That is, the frame rate as determined by the coded data stream on a constant rate transmission path has a long term average which is equal to the rate at which the video frames are received but if inspected over a short time interval the rate at which the frames are transmitted in the coded data stream can vary by a large amount. This variation of the occurence of data relating to the frames within the coded data stream s hereinafter known as jitter.

This is illustrated in FIG. 1 in which it is assumed that the average frame rate of the coded data stream over a six picture frame series is the same as the picture frame rate in the original video signal but with a varying amount of jitter associated with each picture. Thus pictures 1, 2 and 6 have zero jitter as picture frames 1, 2 and 6 of the coded data stream occur at the same rate as the original video signal. The coded data associated with pictures 3 to 5, on the other hand, have varying amounts of jitter j, (as a phase lag) since they do not occur at the expected time.

Decoders are able to calculate the instantaneous jitter in a data stream. They can determine which part of the picture is currently being reconstructed and hence the proper unjittered time in the output video. By counting the bits it receives the decoder can determine the amount of jitter (phase lag). Similarly an encoder can determine the jitter present in its output.

When such an encoder is used with a transmission link having a fixed capacity it is necessary to use a buffer to perform a smoothing and regulating function that can cope with the short term fluctuations in the coded data rate to allow constant data rate transmission in the coded data stream. The encoder then operates to ensure that the buffer does not underflow or overflow.

The specification to which the encoder operates will generally specify the maximum buffer delay to be used when carrying out the coding function. Since the coder is constrained to operate within these bounds, a buffer having the same delay can be used in a compatible decoder in the knowledge that this buffer will not underflow or overflow as the decoder decodes the "jittery" received coded data stream into video signals.

Such buffers in the coder and decoder introduce a time delay equal to the total time it takes a datum to pass through each buffer. There are also delays introduced by the processing necessary to carry out the coding and decoding, which are small relative to the buffer delay, and a fixed delay due to a transmission path length which, with the processing delays, forms a fixed delay overhead for a given system.

The delays introduced by the buffers of the system, must be bounded for interactive applications (values under about 150 ms are typical) if conversation is to be carried out effectively. Such buffers could not, however, cope with seconds of little motion followed by seconds of a great deal of motion over the whole picture area. To handle these situations the coding scheme of a fixed rate encoder is dynamically adjusted so that the medium-term rate of data generation is within the smoothing capability the buffer and the long-term average rate exactly matches the required transmission channel data rate.

Commonly, feedback from the buffer controls the step size of a quantisation process, as for example in the coding standard CCITT Recommendation H. 261, to effect the required dynamic changes in the data rate.

There are circumstances when it is desirable to employ a transcoder which can accept a received data stream encoded according to a first scheme and output an encoded data stream encoded according to a second coding scheme. If one had a decoder which operated according to a second coding scheme then such a transcoder would allow reception of the transmission encoded according to the first coding scheme.

The conventional approach to constructing such a transcoder is shown in FIG. 2. A decoder comprising a buffer 208 and an interframe decoder section 204, which operates according to a first coding scheme, decodes a compressed video signal received on a transmission line 202 into an uncompressed video signal. The buffer 208 is used so that the decoder section 204 provides an output of the uncompressed video signal at the same regular rate as a source video signal, as described earlier. The size of the buffer 208 is equal to that of the original encoder (not shown) so that the buffer can tolerate the maximum jitter in the compressed video signal. It is necessary to provide full decoding because the video coding schemes which provide a high degree of compression provide little, and usually no, opportunity for useful conversion processing on the coded data itself.

The uncompressed video signal is then encoded by an encoder comprising an encoder section 206 and a buffer 210 according to a second scheme to output a new compressed data stream. The further buffer 210 has a delay sufficient, in conjunction with the encoder section 206, to provide a constant data rate compressed video data stream for output on line 212. The buffer 210 is the same size as the buffer in the target decoder (not shown) so that the target decoder can decode the incoming signal received from the transcoder. Thus, in the prior art the accepted approach to providing a transcoder is to carry out a full decode operation to reconstitute the original regular video signals and then to carry out the usual encoding of these video signals to provide a new coded data stream according to the second coding scheme.

A problem with such known transcoders is that the buffers 208, 210 introduce further delay into the system, the end-to-end delay being the sum of the original encoder delay, the transcoder delay (i.e. buffer 208 and 210) and the target decoder delay (plus the above mentioned processing and transmission delays). The end-to-end delay is thus twice the delay of the original encoder and the target decoder.

SUMMARY OF THE INVENTION

According to the present invention a transcoder comprises: a decoder for decoding a received data stream encoded according to a first coding scheme which specifies a first maximum amount of jitter that may be present in the encoded data stream; an encoder for encoding a data stream from the decoder according to a second coding scheme which specifies a second maximum amount of jitter that may be present in the encoded data stream; characterised in that the transcoder is arranged such that the data stream received by the encoder has a non-zero amount of jitter; and the encoder is arranged to produce a coded data stream having an amount of jitter which is less than or equal to the second maximum amount of jitter.

According to a further aspect of the invention, a transcoder for converting video signals encoded according to a first coding scheme in which the coded signal contains video information at an irregular frame rate into signals encoded according to a second coding scheme in which the coded signal contains video information at an irregular frame rate, comprises a decoder operable in accordance with the first coding scheme and an encoder operable in accordance with the second coding scheme and is characterised in that the transcoder is arranged to transfer video data from the decoder to the encoder at an irregular frame rate.

The delay of such a transcoder is less than that that would occur were the data transferred at a constant frame rate.

In contrast to the approach taken in the prior art, the present invention is based or the realisation that it is possible to operate a transcoder such that the decoder provides a decoded video data stream which retains a degree of jitter when it reaches the encoder. Thus the buffering requirement does not need to match that of the original encoder. This means little or no buffering need be provided in the transcoder to ensure that the jitters are compatible. This reduced buffer requirement provides a reduced buffer delay for such a transcoder compared to prior art transcoders.

That is, a transcoder according to the present invention need not have a buffer capable of removing all the jitter from the decoded signal nor use a buffer with the encoder or sufficient delay to permit the maximum amount of jitter to be introduced into the coded data stream allowed by the second coding scheme. Rather the buffer means in the transcoder may be used to match the jitter in the decoded data stream from the decoder to that allowed in the second coding scheme. In some cases, as will be explained, a buffer may not be necessary at all.

If a buffer means is present it may be provided before the decoder, or between the decoder and the encoder, or following the encoder or any combination of the three.

The maximum delay through any buffer means is a constant value regardless of whether the buffer stores coded or decoded data. However, the physical size of the buffer is determined by the maximum delay multiplied by the transmission rate so it is often preferable that the buffer means is located in the low bit rate transmission path of the transcoder to minimise the buffer storage requirement.

The maximum jitter of the second coding scheme may be less than, equal to, or greater than that of the first coding scheme.

If the buffer delay (i.e. maximum jitter) of the original encoding algorithm is less than that of the final decoder then two extreme situations can occur: the first is where the encoder of the transcoder operates to take full advantage of the freedom allowed by the final decoder's buffer delay. In order to do this the encoder of the transcoder is permitted to introduce more jitter to that introduced by the encoder originating the coded data stream received by the transcoder. In this case there will need to be buffering means able to introduce an additional amount of jitter equal to the difference in the allowed jitters. At the other extreme the transcoder is operated on the assumption that the picture quality has already been limited by the original encoder buffer and that no extra jitter is to be introduced by the encoder of the transcoder. Under these circumstances there is no requirement for a buffer means in the transcoder as the encoder is permitted to pass on all the jitter present in the decoded data stream supplied by the decoder of the transcoder (although a small buffer may still be required to ensure a constant bit rate at the output of the transcoder).

In general the transcoder could be operated at any intermediate position between the two extreme cases in which case the buffer size need only be sufficient to cope with the additional jitter to be introduced. Thus the size of the buffer is equal to or less than the absolute difference between the maximum amount of jitter of the first encoding scheme and the maximum amount of jitter of the second coding scheme.

If the jitter allowed in the original encoder algorithm (the first coding scheme) is larger than that of the final decoder (the second coding scheme) the buffer means removes that amount of jitter which will allow the encoder of the transcoder to operate with the amount of jitter of the second coding scheme.

If the buffer means comprises a buffer in front of the decoder then the encoder is operated to demand decoded data the decoder to prevent the buffer from underflowing or overflowing.

If the buffer means comprises a single buffer between the decoder and the encoder then the encoder is controlled to prevent the buffer from underflowing or overflowing.

If the buffer means comprises a buffer placed after the encoder then again the encoder is controlled to prevent the buffer from underflowing or overflowing.

If the buffer means comprises two or more buffers then the encoder as controlled to keep all the buffers from underflowing or overflowing.

The uncompressed video signal having the non-zero jitter may be transferred to the encoder in analogue or digital form. In digital form it is possible to provide a digital interface with a continuously varying clock frequency, although this may not be an attractive engineering option. An analogue interface would require the cut-off frequencies of a reconstruction filter at the digital to analogue converter and an anti-alias filter at the analogue to digital converter, which is also not a particularly attractive option.

A preferred interface between the decoder and encoder, suitable for both analogue and digital cases, is an asynchronous one in which small packets of video data are transferred at a fixed clock rate. In between the packets varying periods of no video signal occur. The fixed rate needs to be sufficiently high to cope with the maximum jitter compression. A suitable packet may be one line of video, a block of picture elements in block based algorithms or, for decoders using programable rather than dedicated logic, single picture elements may be appropriate. Transferring lines of picture elements is particularly appropriate for transfer in analogue form as this avoids problems with joins between packets as they fall at the edges of the picture.

In general it is not possible to take any known given encoder and decoder equipment and make simple modifications to produce a transcoder according to the present invention. Although algorithms may be standardised, the implementations most frequently found are not, so the modifications needed to be made to provide a transcoder according to the present invention are dependent on the particular existing designs. However, apart from the control of the buffers, implementation of a transcoder according to the invention does not require any fundamentally new design techniques.

The exact means of control of the encoder of the transcoder s determined to a large decree by the characteristics of the algorithms used by the coder and decoder and the particular buffer arrangements utilized.

There are essentially two means to control the encoder: feed forward and feedback.

Feed forward examines the input signal to the transcoder to determine how the first compression scheme is operating at each region of the picture. For example, an algorithm with dynamically selectable quantisation step size must include that parameter in the coded data. This gives information on the instantaneous compression. The encoder of the transcoder will modify its degree of compression accordingly. In particular, if there is no buffer in the transcoder, the encoder of the transcoder will attempt to match its instantaneous compression to that of the original encoder. There will also be a constant scaling of the compression if the average bits/picture elements are different, either because of different bit rates or different frame resolutions or both.

If the maximum amount of jitter of the first coding scheme is greater than that of tie second coding scheme, the transcoder can be thought of as reducing the jitter by 'de-emphasizing' its encoder's following of the original encoder. (Less jitter means closer to a constant number of bits per picture elements).

If the maximum amount of jitter of the first coding scheme is less than that of the second coding scheme, the transcoder must increase the jitter, i.e. 'it exaggerates' its tracking of the original encoder.

The feedback method observes the buffers and modifies the transcoder's encoder's parameters to steer the buffer fill to the instantaneous value at which it should be maintained. This is similar to the conventional control strategies described earlier in this application. Feedback information can also be derived from examining the transcoder output to determine the jitter present as mentioned above.

The transcoder buffer is exercised over the range representing the difference between the original encoder and final decoder buffer sizes. This is in contrast to conventional buffer controls which need to prevent the fill going beyond full and empty limits: with the present invention the transcoder ensures that these limits are reached to maintain the predetermined amount of non-zero jitter in the decoded data stream between the decoder and encoder. However, because the feedforward method is open-loop, there is a danger that it cannot control the encoder with adequate precision under all circumstances to prevent buffer underflow or overflow. A further consideration is that the discrete steps available to the rate control mechanisms of the two algorithms may not align exactly with each other. Thus, the transcoder buffer needs to be of a sufficient size to give margins at both ends and a combination of feedforward and feedback is probably best.

It should be noted that video coding algorithms do not necessarily use the same spatial and temporal sampling frequencies (number of lines, number of pixel elements per line, number of frames per second). Methods of standards conversion, ie interpolation, are well known and now invariably operate with PCM video signals. Such conversions are readily incorporated in transcoders and can equally well be included in a transcoder according to the present invention.

BRIEF DESCRIPTION OF THE DRAWINGS

Embodiments of the present invention will now be described, by way of example only, with reference to the accompanying drawings, in which:

FIG. 2A is a schematic diagram of the transcoder of FIG. 2;

FIG. 3A as a schematic diagram of the transcoder of FIG. 3;

FIG. 4 is a schematic diagrams of a further embodiment of the present invention having a buffer between the decoder section and encoder section;

DETAILED DESCRIPTION OF EXEMPLARY EMBODIMENTS

Figure 1:
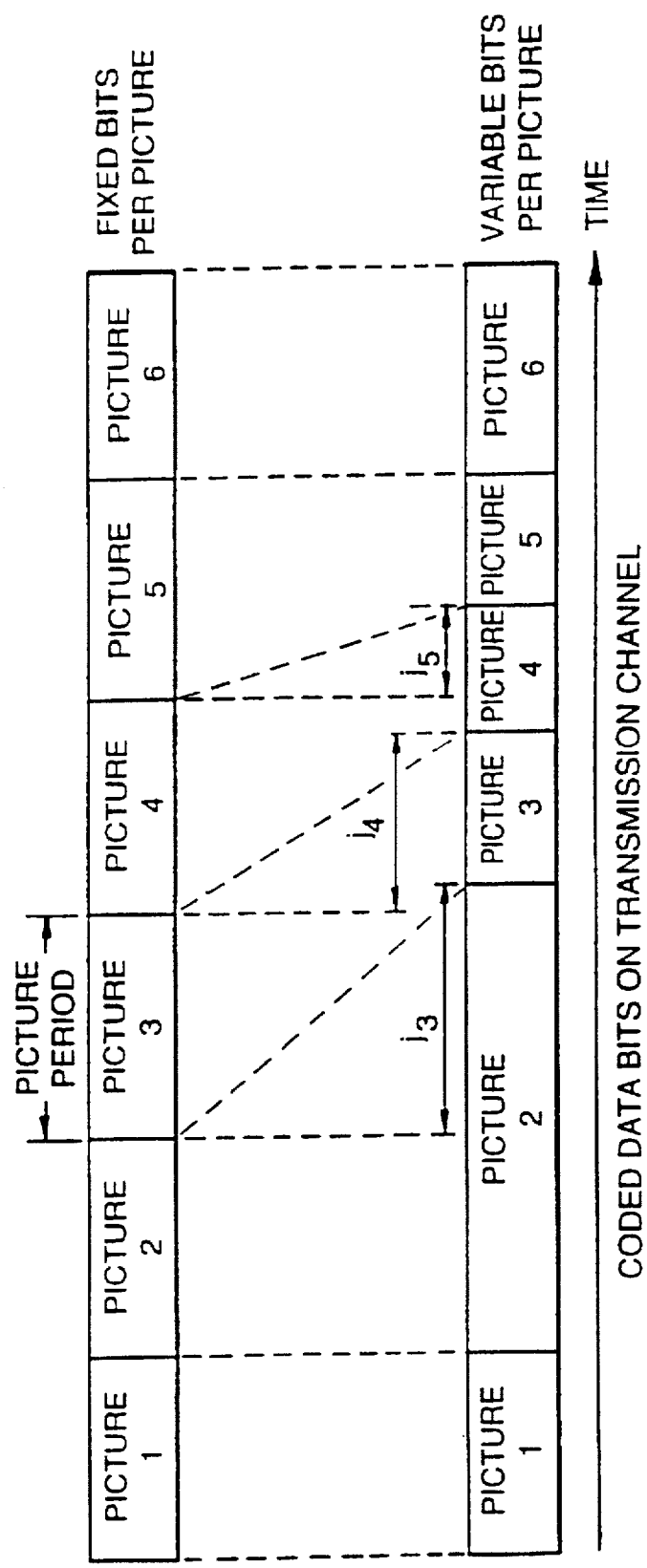
FIG. 1 schematically depicts varying frame jitter in coded data bits on a transmission channel.
Figure 2:
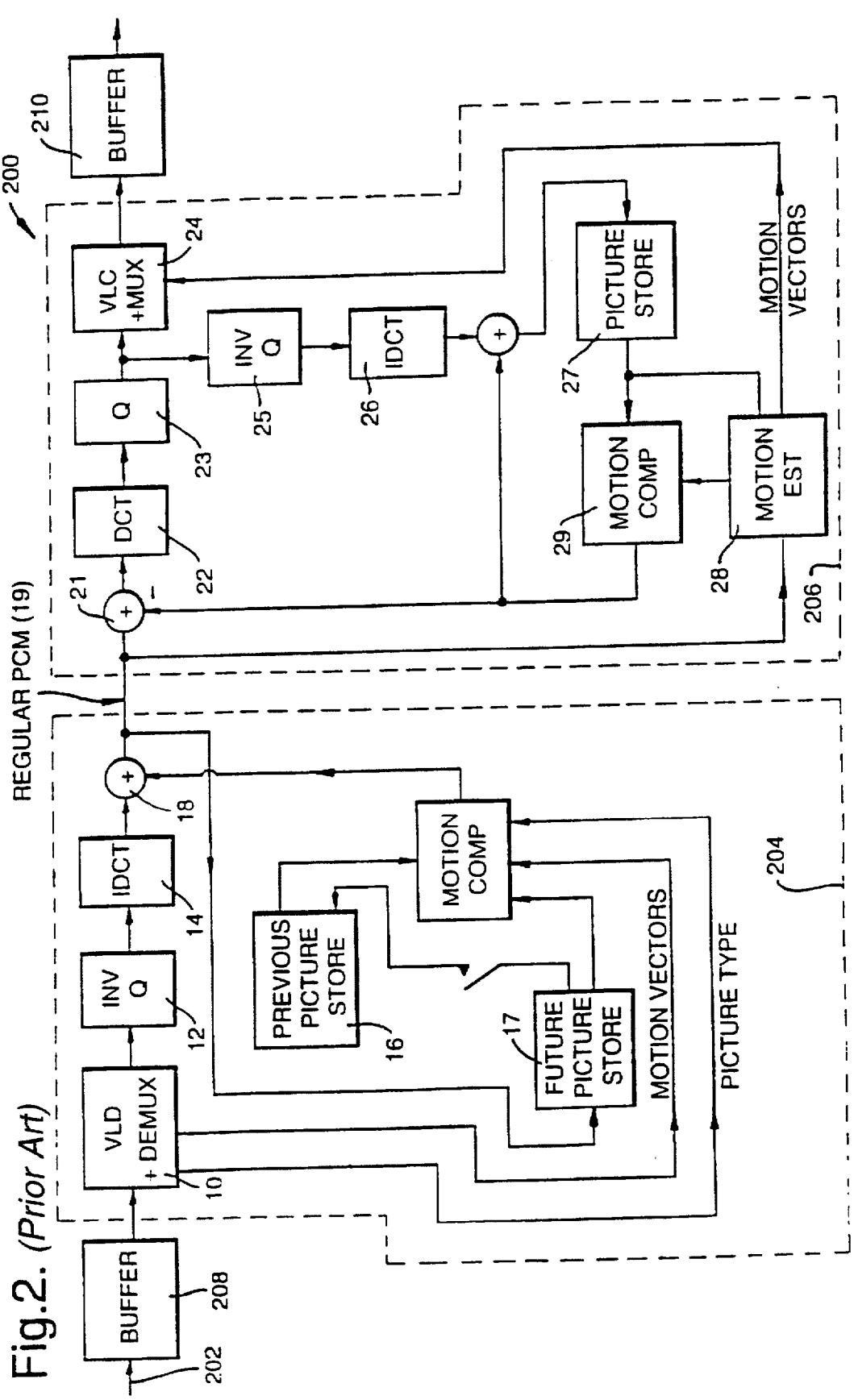
FIG. 2 shows a known transcoder for converting video signals from an MPEG-1 format to an H. 261 format.

Referring to FIG. 2, which has already been referred to above, a known transcoder 200 comprises a decoder 204, 208 which conforms to the ISO-IEC standard 11172 "Coding of moving pictures and audio for digital storage media at up to about 1.5 Mbit/s" (known colloquially as MPEG-1), coupled directly to an encoder 206, 210 which conforms to the CCITT H. 261 Recommendation. The decoder section 204 includes a variable length decoder and demultiplexer 10 which decodes the received video signal encoded according to MPEG-1 and demultiplexes the motion vectors from the signal. The decoded signal is then passed to an inverse quantiser 12, which restores the levels of the decoded signal and then to an inverse DCT transformer 14 which restores the values of the decoded signals. MPEG-1 employs intraframe, interframe and bidirectional coding and thus the decoder section 204 includes frame stores 16, 17 to store a prediction of the previous and future input frames respectively. The motion vectors are passed to a motion compensation predictor which updates a frame from one of the frame stores 16, 17. This motion compensated picture is then added by adder 18 to the decoded signal to produce an uncompressed decoded video signal 19. The elastic buffer 208, of the same size as that in the original MPEG-i encoder (not shown), receives the encoded signal on the line 202 and transfers the signal to the decoder section 204 at a constant frame rate. The uncompressed video signal thus has the same regular frame rate as the original video signal.

The uncompressed regular video signal 19 is input to an H. 261 encoder which comprises an encoder section 206 having a DCT processor 22, a quantiser 23 and a variable length coder and multiplexer 24. The output of the quantiser 23 is also passed to an inverse quantiser 25 and then to an inverse DCT 26 to produce a predicted picture which is stored in a previous picture store 27. The incoming video signal 19 is also passed to a motion estimator 28 which compares the current picture with the previous picture stored in the previous picture store 27 to produce a motion compensated picture 29. The motion compensated picture is then subtracted from the current picture by subtracter 21 to produce a difference signal which is coded by the encoder section 206. The elastic buffer 210, having a capacity equal to the target decoder (not shown), matches the encoder's output to the fixed rate provided by the output line 212.

Such a transcoder is suitable for receiving a video or audio signal coded according to the MPEG-1 coding scheme and outputting a signal encoded according to the H. 261 recommendation.

FIG. 2A is a schematic diagram of the transcoder shown in FIG. 2. Say the fixed delay overhead of the original MPEG-1 encoder (not shown) is a and the maximum amount of jitter (i.e. the maximum delay provided by the original encoder's buffer) of the MPEG-1 encoded data stream is x, the output from -he original encoder may occur at any time from a to a+x after the input to the encoder. The video signal input to the transcoder is received by the buffer 208 which is equal in size to the buffer in the original encoder i.e. x. The buffer 208 outputs the received signal to the decoder section 204 at the regular frame rate of the original video signal to produce a regular uncompressed video signal 19 from the decoder section 204. This signal is then encoded by the encoder section 206 and passed to the buffer 210 which outputs the coded signal at a constant bit rate. The buffer 210 is of the same capacity z as the buffer in the final decoder (not shown). If the delay overhead of the transcoder's decoder section 204 is $b_1$ and that of the transcoder's encoder section 206 is $b_2$, the maximum delay of the encoded data stream output from the known transcoder is $a+x+x+b_1+b_2+z$.

Figure 3:
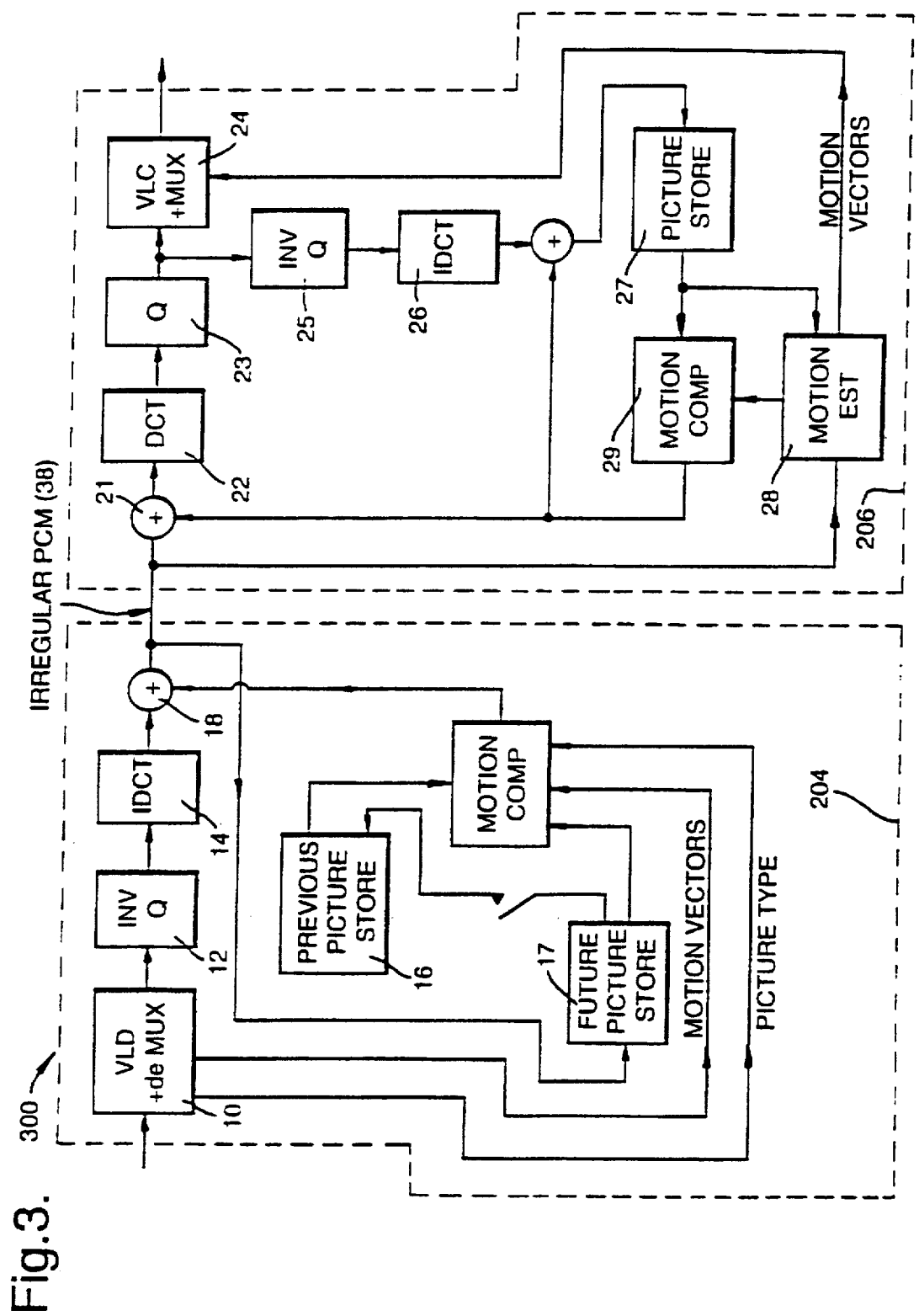
FIG. 3 shows a transcoder according to a first embodiment of the present invention which requires no buffer means.

FIG. 3 shows a transcoder 300 according to one embodiment of the invention which is applicable when the maximum amount of jitter of the MPEG-1 coding scheme is less than that of the H. 261 coding scheme. The decoder and encoder sections 204 and 206 are the same as shown in FIG. 2 but the buffers 208 and 210 are no longer present. The fixed delay overhead of the original MPEG-1 encoder and the maximum amount of jitter of the MPEG-1 encoded data stream are the same as that described above with reference to FIG. 2. The video signal input to the transcoder 300 is decoded by a decoder section 204 at the irregular frame rate at which it is received (the buffer 208 now being absent) to produce an irregular uncompressed video signal 38 from the decoder. As shown in FIG. 3A, if the delay overhead of the transcoder's decoder section 204 is $b_1$ and that of the transcoder's encoder section 206 is $b_2$, the delay of the encoded data stream output from the encoder section 206 ranges from $(a+b_1+b_2)$ to $(a+b_1+b_2+x)$ (i.e. there is a maximum sitter of x in the coded data stream). Thus the encoder 206 (the buffer 210 being omitted) is permitted to pass on all of the jitter present in the decoded compressed stream supplied by the decoder 204, this jitter being less than that allowed in the H. 261 coding scheme.

FIG. 4 shows a transcoder 400 comprising an MPEG-1 decoder section 204 and a.H. 261 encoder section 206 which are the same as those shown in FIGS. 2 and 3 but for simplicity have been illustrated schematically. The decoder section 204 and the encoder section 206 are connected via a buffer 406. The encoder section 206 in this instance is controlled with reference to the contents of the buffer 406, to prevent the buffer 406 from underflowing or overflowing.

Figure 5:
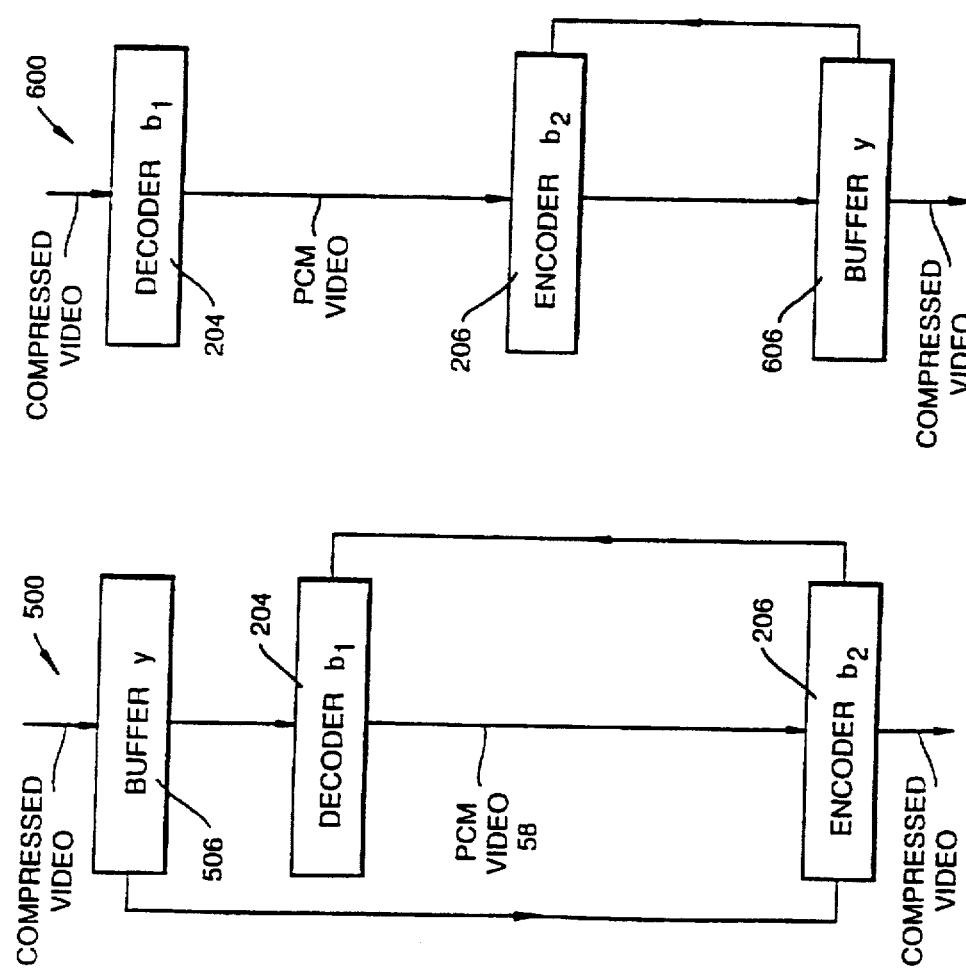
FIG. 5 is a schematic diagram of a further embodiment of the present invention in which the buffer means comprises a buffer in front of the decoder section.

FIG. 5 shows schematically a transcoder 500 comprising an MPEG-1 decoder section 204 coupled directly to a H. 261 encoder section 206. A buffer 506 is located in front of the decoder section 204. Decoded uncompressed data is demanded by the encoder section 206 from the decoder section 204 to prevent the buffer 506 from under- or overflowing.

Considering the same fixed delay overheads for the original encoder (a) and the transcoder $(b_1+b_2)$ set out above, when the maximum amount of jitter x of the MPEG-1 coding scheme is less than that z of the H. 261 coding scheme, the elastic buffer 406 or 506 of maximum capacity y provides additional jitter to the coded data stream. When the jitter in the data stream from the original encoder is zero, the buffer 406 is empty; the output of the transcoder is thus merely delayed by the fixed delay overheads $a+b_1+b_2$. When the jitter in the data stream from the original encoder is maximum (i.e. x), the buffer is full and the data stream is delayed by y; the output of the transcoder is then delayed by $a+x+b_1+b_2+y$ i.e. the encoded data stream has a maximum jitter of x+y. The size y of the buffer 406 is chosen so that $y \leq |x-z|$. This results in an improved picture quality- as compared with the output of a transcoder shown in FIG. 3. The uncompressed video signal output from the decoder section 204 is delayed by the buffer 406. The uncompressed signal 48 thus has a jitter that varies between $b_1$ and $b_1+y+x$ (i.e. a maximum jitter of x+y), unlike conventional transcoders in which the compressed video is unjittered.

When the maximum amount of jitter x of the MPEG-1 coding scheme is greater than that z of the H. 261 coding scheme, the buffer removes a maximum amount y of jitter from the coded data stream. As shown with reference to FIG. 5, when the jitter in the data stream from the original encoder is zero, the buffer 506 is full and the data stream is delayed by y; the output of the transcoder is thus delayed by a+b+y. When the jitter in the data stream from the original encoder is maximum (i.e. x), the buffer is empty; the output of the transcoder is thus merely delayed by the faxed delay overheads and the original buffer delay a+b+x. The encoded data stream therefore has a maximum jitter of (a+b+x)−(a+b+y) i.e. x−y. The size y of the buffer 506 is chosen so that $y \leq |x-z|$. Thus the encoder 504 operates with an amount of jitter allowed in the H. 261 coding scheme. The uncompressed video signal 58 retains the irregular frame rate of the video signal encoded according to the first coding scheme.

Figure 6:
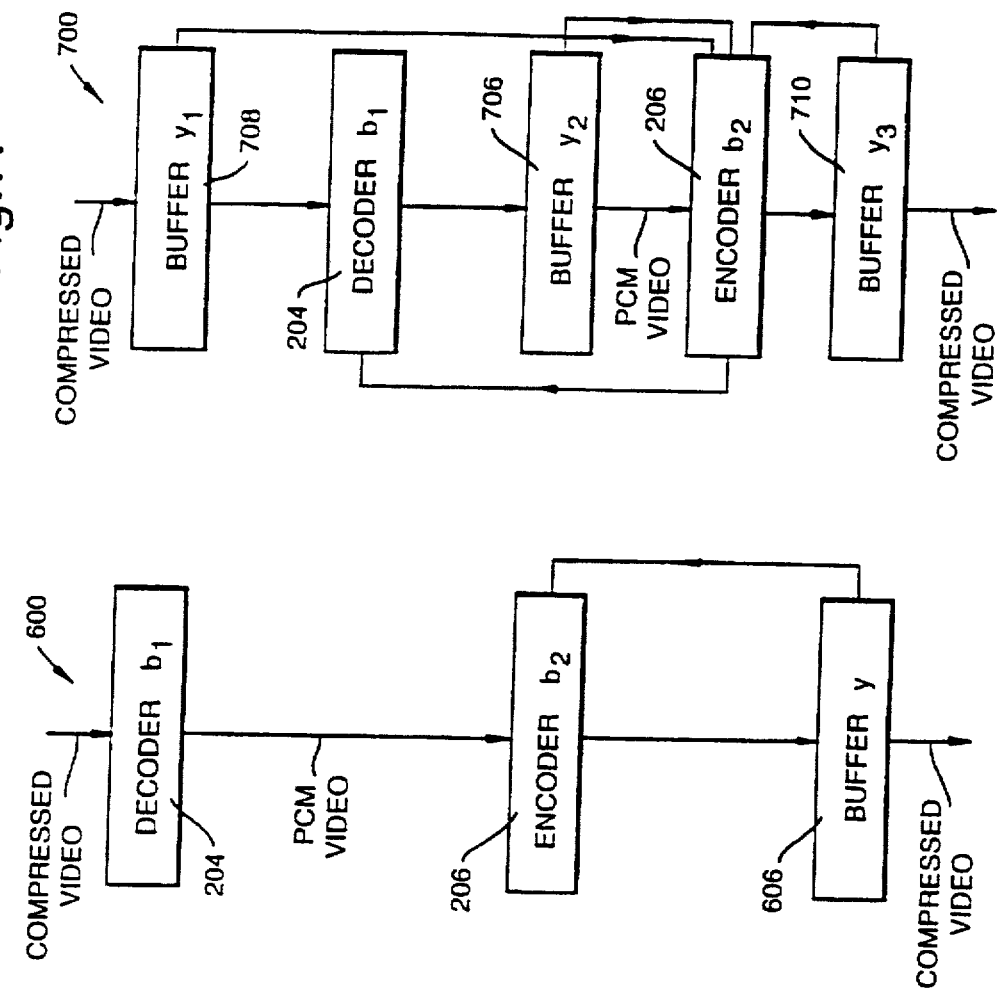
FIG. 6 is a schematic diagram of a further embodiment of the present invention having a buffer after the encoder section.

Referring now to FIG. 6 a transcoder 600 comprises a MPEG-1 decoder section 204 coupled to a H. 261 encoder section 206, the output of which is fed to a buffer 606. Again the encoder section 206 is controlled with respect to the fill level of the buffer means.

Figure 7:
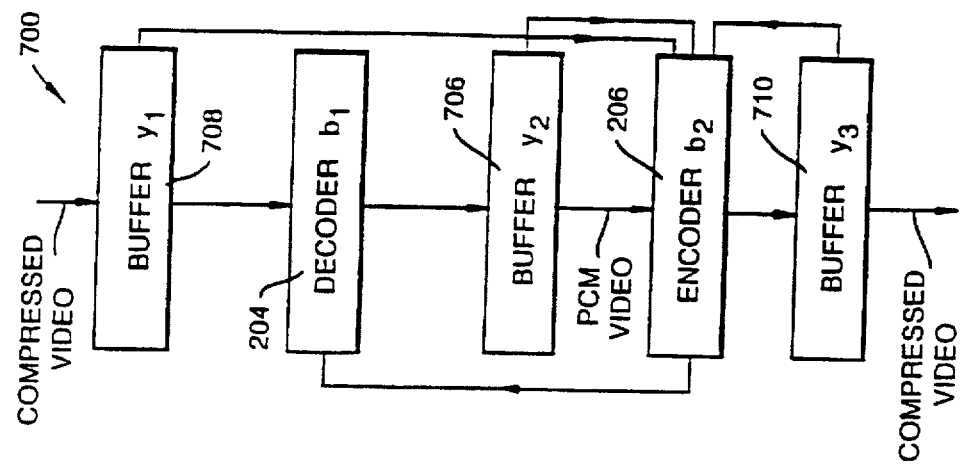
FIG. 7 is a schematic diagram of a yet further embodiment of the present invention in which the buffer means comprises three buffers placed before the decoder section, between the decoder and the encoder sections and after the encoder section respectively.

Referring now to FIG. 7 a transcoder 700 comprises an MPEG-1 decoder section 204 coupled to a H. 261 encoder 206 via a buffer 706. The buffer means also includes a buffer 708 in front of the decoder section 204 and a buffer 710 following the encoder section 206. The total capacity $y_1+y_2+y_3$ of the buffers 706, 708 and 710 is less than x+z.

If the maximum amount of jitter of the MPEG-1 coding scheme is less than that of the H. 261 coding scheme, the buffer(s) 606, 706, 708, 710 adds fitter to the coded data stream as described above with reference to FIG. 4, so that the encoder section 206 operates with an amount of jitter allowed in the H. 261 coding scheme.

If the maximum amount of jitter of the MPEG-1 coding scheme is greater than that of the H. 261 coding scheme, the buffer(s) 606, 706, 708, 710 removes jitter from the coded data stream as described above with reference to FIG. 5, so that the encoder section 206 operates with an amount of jitter allowed in the H. 261 coding scheme.

In all of the embodiments shown, the total delay of the original encoder, the transcoder and the final decoder does not exceed that of a combination as shown in FIG. 2 of an encoder and decoder for the coding scheme having the greater maximum amount of jitter. This is less than the total buffering delay of an end-to-end system using a conventional transcoder which would be the sum of the delays for the first coding scheme aid the second coding scheme.

The transcoder according to the present invention may be operated as a bi-directional transcoder in which case translation occurs in both directions between two usually different video coding standards, or the application may provide one way access, for example when linked to a picture database.

Whilst the specific examples given above relate to a transcoder for converting a video signal encoded according to an MPEG-1 coding scheme into a video signal encoded according to a coding scheme conforming to the H. 261 standard, it will be appreciated that a transcoder according to the invention may be arranged to convert any signal, video or otherwise, into an alternative format.

I claim:

1. A transcoder for receiving and transmitting coded data streams, each coded data stream having a regular long-term average frame rate and an instantaneous irregular frame rate, the variation of the occurrence of frame within each coded data stream being known as jitter, the transcoder comprising:

a decoder section for decoding a received data stream encoded according to a first coding scheme which specifies a first maximum amount of jitter that may be present in the encoded data stream;

an encoder section for encoding a data stream from the decoder according to a second coding scheme which specifies a second maximum amount of jitter that may be present in the encoded data stream;

the transcoder being arranged such that the data stream received by the encoder section has a non-zero amount of jitter; and the encoder section being arranged to produce a coded data stream having an amount of jitter which is less than or equal to the second maximum amount of jitter.

2. A transcoder comprising:

a decoder section for decoding a received data stream encoded according to a first coding scheme which specifies a first maximum amount of jitter that may be present in the encoded data stream;

an encoder section for encoding a data stream from the decoder according to a second coding scheme which specifies a second maximum amount of jitter that may be present in the encoded data stream;

the transcoder being arranged such that the data stream received by the encoder section has a non-zero amount of jitter;

the encoder section being arranged to produce a coded data stream having an amount of jitter which is less than or equal to the second maximum amount of jitter;

the first maximum amount of jitter being less than the second maximum amount of jitter; and buffer means having a capacity which is the minimum sufficient to introduce an additional amount of jitter equal to or less than the absolute difference between the first amount of jitter and the second maximum amount of jitter.

3. A transcoder comprising:

a decoder section for decoding a received data stream encoded according to a first coding scheme which specifies a first maximum amount of jitter that may be present in the encoded data stream:

an encoder section for encoding a data stream from the decoder according to a second coding scheme which specifies a second maximum amount of jitter that may be present in the encoded data stream;

the transcoder being arranged such that the data stream received by the encoder section has a non-zero amount of jitter;

the encoder section being arranged to produce a coded data stream having an amount of jitter which is less than or equal to the second maximum amount of jitter;

the first maximum amount of jitter being greater than the second maximum amount of jitter; and buffer means having a capacity which is the minimum sufficient to remove an amount of jitter equal to or less than the difference between the first maximum amount of jitter and the second maximum amount of jitter.

4. A transcoder as in claim 2 in which the buffer means comprises a buffer preceding the decoder section.

5. A transcoder as in claim 2 in which the buffer means comprises a buffer between the decoder section and the encoder section.

6. A transcoder as in claim 2 in which the buffer means comprises a buffer following the encoder section.

7. A transcoder as in claim 1, in which the received data stream represents a video signal.

8. A method of converting a received data stream encoded according to a first coding scheme into a data stream coded according to a second coding scheme, each scheme having a regular long-term average frame rate and an instantaneous irregular frame rate, the variation of the occurrence of frames within each data stream being known as jitter, which schemes specify, respectively, a first and a second maximum amount of jitter that may be present in the encoded data streams, said method comprising:

decoding the received data stream into a data stream that has a non-zero amount of jitter, and encoding the resulting data stream according to the second coding scheme having an amount of jitter that is less than or equal to the second maximum amount of jitter.

9. A method of converting a received data stream encoded according to a first coding scheme into a data stream coded according to a second coding scheme, which schemes specify, respectively, a first and a second maximum amount of jitter that may be present in the encoded data streams, said method comprising:

decoding the received data stream into a data stream that has a non-zero amount of jitter, coding the resulting data stream according to the second coding scheme having an amount of jitter that is less than or equal to the second maximum amount of jitter, and when the first maximum amount of jitter is less than the second maximum amount of jitter, introducing a delay which is the minimum sufficient to introduce an additional amount of jitter equal to or less than the absolute difference between the first maximum amount of jitter and the second maximum amount of jitter.

10. A method of converting a received data stream encoded according to a first coding scheme into a data stream coded according to a second coding scheme, which schemes specify, respectively, a first and a second maximum amount of jitter that may be present in the encoded data streams, said method comprising:

decoding the received data stream into a data stream that has a non-zero amount of jitter, coding the resulting data stream according to the second coding scheme having an amount of jitter that is less than or equal to the second maximum amount of jitter, and when the first maximum amount of jittering is greater than the second maximum amount of jitter, introducing a delay which is the minimum sufficient to remove an amount of jitter equal to or less than the difference between the first maximum amount of jitter and the second maximum amount of jitter.

11. A method as in claim 8 in which the received data stream represents a video signal.

12. A method as in claim 8 in which the decoded data stream having a non-zero amount of jitter is transferred to means for coding according to the second coding scheme in packets of data in an asynchronous manner.

13. A transcoder for converting video signals encoded according to a first coding scheme in which the coded signal contains video information at an irregular frame rate into signals encoded according to a second coding scheme in which the coded signal contains video information at an irregular frame rate, comprising:

a decoder section operable in accordance with the first coding scheme, and an encoder section operable in accordance with the second coding scheme, the transducer being arranged to transfer video data from the decoder section to the encoder section at an irregular frame rate.

* * * * *